United States Patent [19]
Ashing et al.

[11] Patent Number: 4,801,628
[45] Date of Patent: Jan. 31, 1989

[54] ETHERIFIED PHOSPHORIC ACID ESTER OF EPOXY RESIN

[75] Inventors: Deanna Ashing, Cincinnati; Stanley Hiltenbeitel, Loveland; Youssef Moussa; Patrick F. Aluotto, both of Cincinnati, all of Ohio

[73] Assignee: BASF Corporation, Coatings and Inks Division, Clifton, N.J.

[21] Appl. No.: 123,454

[22] Filed: Nov. 20, 1987

[51] Int. Cl.$^4$ .................. C08L 63/00; C08G 59/14
[52] U.S. Cl. ................... 523/412; 523/402; 523/416; 525/110; 525/523; 528/108; 528/400; 428/418
[58] Field of Search ............. 523/402, 412, 416; 525/523, 110; 528/108, 400

[56] References Cited

U.S. PATENT DOCUMENTS

| | | | |
|---|---|---|---|
| 3,519,493 | 7/1970 | Farone | 525/118 X |
| 3,551,517 | 12/1970 | Dowbenko et al. | 525/110 |
| 4,059,550 | 11/1977 | Shimp | 523/404 |
| 4,238,573 | 12/1980 | Hamilton | 525/110 |
| 4,276,392 | 6/1981 | Chaatha | 525/118 |
| 4,284,754 | 8/1981 | Chattha et al. | 528/108 X |
| 4,289,812 | 9/1981 | Martin | 427/379 |
| 4,360,613 | 11/1982 | Shimp | 523/416 |
| 4,388,374 | 6/1983 | Shimp | 428/414 |
| 4,397,970 | 8/1983 | Campbell et al. | 523/402 |
| 4,425,451 | 1/1984 | Sekmakas et al. | 523/414 |
| 4,452,929 | 6/1984 | Powers et al. | 523/403 |
| 4,461,857 | 7/1984 | Sekmakas et al. | 523/414 |
| 4,497,946 | 2/1985 | Sekmakas et al. | 528/99 |
| 4,598,109 | 7/1986 | Sekmakas et al. | 523/414 |
| 4,613,661 | 9/1986 | Langer et al. | 528/108 |
| 4,638,020 | 1/1987 | Christenson et al. | 523/402 X |

Primary Examiner—Earl Nielsen
Attorney, Agent, or Firm—Michael R. Chipaloski

[57] ABSTRACT

A non-water dispersible, oxirane-defunctionalized, etherified, phosphoric acid ester of an epoxy resin is useful in enhancing the adhesion of aqueous thermosetting coating compositions useful as a varnish or white coating for drawn and ironed aluminum containers. The epoxy resin ester is prepared by reacting (a) an epoxy resin having an epoxy equivalent weight of at least about 190;

(b) orthophosphoric acid in an amount of 0.2 to 0.45 equivalents per equivalent of epoxy resin;

(c) at least about 0.65 equivalents, per equivalent of epoxy resin, of a reactive hydroxyl-functional compound having at least one hydroxyl group reactive with an oxirane group of said epoxy resin, said hydroxyl-functional compound being a solvent for said epoxy resin and for the non water-dispersible, defunctionalized, etherified, phsophoric acid epoxy resin ester reaction product; and (d) water in an amount of 0-20% of the weight of the orthophosphoric acid. By "non water-dispersible" is meant that the resin additive, either with or without being salified with a base, is not dispersible by itself in water.

21 Claims, No Drawings

ETHERIFIED PHOSPHORIC ACID ESTER OF EPOXY RESIN

FIELD OF THE INVENTION

The invention relates to resins useful for enhancing the adhesion of organic resin-containing coating compositions, particularly aqueous organic resin-containing compositions, and more particularly such coatings suitable for drawn and ironed aluminum containers. The invention also relates to methods of making the resin and to coating compositions incorporating the resin.

DESCRIPTION OF THE PRIOR ART

Coating compositions containing organic resins are in wide use. It is a relatively simple matter to provide such a coating composition by simply dissolving one or more film-forming resins in an organic solvent. However, because of the cost, and because of the problems of toxicity, solvent recovery, volatile organic emission restrictions, and the like, reduction or elimination of the use of organic solvents is desirable. Accordingly, many aqueous based coating compositions have been developed in which film-forming organic resins are dispersed or solubilized in water or in an aqueous solvent system in which the content of any organic solvents is minimized. Some organic film-forming resins are relatively easily adapted to aqueous solvent systems whereas others are not.

One class of aqueous synthetic resin-base coating compositions in wide use at the present time is used as a white coating or varnish in the coating of drawn and ironed aluminum and steel containers for beer and beverage usage. The aluminum may or may not have a conversion coating. The aqueous coating compositions which have been successfully developed for this use include a base resin, an amino resin which acts as a cross-linker and together with the base resin makes up the film-forming portion of the composition, water, often a relatively small amount of organic solvent or co-solvent, catalyst, and other conventional addenda such as a lubricant for abrasion resistance, pigments, and the like. Such coatings are in wide use and are resistant to pasteurization under relatively mild conditions. However, the coatings develop loss of adhesion during pasteurization under more severe conditions or when excessive conversion coating is applied to the aluminum or steel can.

The present invention relates to resin additives which enhance the adhesion of conventional aqueous organic resin-containing coating compositions, particularly the white coatings and varnishes mentioned above. The resin additive according to the invention is a non water-dispersible, oxirane-defunctionalized, etherified, phosphoric acid ester of an epoxy resin. Definition: the expression "non water-dispersible" as used herein in connection with the resin additive according to the present invention means that the resin either with or without being salified with a base, is not dispersible by itself in water.

Epoxy resins themselves are well known film formers suitable for coating formulation, but are not water soluble. Many attempts have been made to make epoxy resins water soluble or at least water dispersible. One technique which has been widely reported is to react an epoxy resin with phosphoric acid to form a phosphoric acid ester of the epoxy resin. These esters are often salified to enhance their water solubility. Several examples of such phosphate esters of epoxy resin are given in the patents.

U.S. Pat. No. 3,519,493 discloses a composition for coating metal surfaces which includes a polymeric polyol, an epoxy resin, phosphoric acid, and a phenolaldehyde resin. The compositions are prepared by charging the ingredients and solvent into a vessel and heating until a homogeneous solution is obtained. Mention is also made of the reaction product of phosphoric acid, an epoxide, and a metal base as being a useful additional constituent.

U.S. Pat. No. 3,551,517 discloses the use of an epoxy resin made from a hydrogenated bisphenol to enhance the adhesion, and other properties, of thermosetting resin coating compositions. The only solvents mentioned are organic, and the epoxy resin additive is used as such and is not pre-reacted in any way.

U.S. Pat. No. 4,059,550 discloses aqueous heat curable coating compositions containing epoxy resins or polyether resins derived therefrom, and aminoplast or phenolplast resins. As a catalyst for curing the reaction there is disclosed an adduct of phosphoric acid and an epoxy resin. About one mol of phosphoric acid is reacted with reach oxirane group of the epoxy resin, and the adduct is dispersible in ammonia or amine water.

U.S. Pat. No. 4,164,487 and U.S. Pat. No. 4,289,812 disclose water-thinnable thermosetting coating compositions containing a neutralized phosphoric acid ester of an epoxy resin. The neutralized ester is made by reacting phosphoric acid with an epoxy resin and contacting the resulting reaction product with at least sufficient base to render the product water thinnable.

U.S. Pat. No. 4,238,573 discloses a phosphated and amine-neutralized epoxy resin used as an additive to reduce the curing temperature and to increase the durability of paints and enamels based on methacrylate interpolymers. An excess of phosphoric acid is used in order to esterify all of the epoxy groups, and pH brought to 7-9 by reaction with amine.

U.S. Pat. No. 4,276,392 discloses a non-aqueous automotive topcoat composition containing an epoxy resin and a phosphoric acid catalyst.

U.S. Pat. No. 4,360,613, U.S. Pat. No. 4,388,374 and U.S. Pat. No. 4,452,929 disclose aqueous water-reducible coating compositions prepared by reacting an epoxy resin, a polyethylene glycol and orthophosphoric acid. The reaction is conducted in the absence of a solvent and the product is water-dispersible. The patents also provide a brief description of several U.S. patents relating to aqueous coating compositions containing epoxy resins.

U.S. Pat. No.4,397,970 discloses a process for preparing an aqueous coating composition in which the principal film-forming component consists of an amine-salified phosphomonoester derivable from an epoxy resin, orthophosphoric acid, and water. The phosphomonoester is prepared by reacting an epoxy resin with an acid source material derivable by reacting phosphoric anhydride with a blocking agent. A resin solvent which may function as the blocking agent but which is otherwise inert is employed as the reaction medium.

U.S. Pat. No. 4,425,451 discloses a monoester reaction product of an epoxy resin and orthophosphoric acid having residual epoxy functionality. The monoester is then reacted with an amine to provide a water-dispersible product lacking oxirane functionality. The monoester salt is provided in a water miscible organic solvent comprising at least about 10% of an ether alcohol, preferably 2-butoxy ethanol. The water-dispersible product is useful as a catalyst in aqueous coating compositions.

U.S. Pat. No. 4,461,857 discloses an aqueous coating compostion containing the oxirane-free reaction product of (1) a monoester reaction product, containing residual oxirane functionality, of an epoxy resin and orthophosphoric acid and (2) an amine.

U.S. Pat. No. 4,497,946 discloses aqueous coating compositions containing epoxy phosphates. An oxirane-functional epoxy phosphate is copolymerized in organic solvent solution with monoethylenically unsaturated monomers, including at least 5% of a carboxyl-functional monomer. The copolymer is essentially oxirane-free, carboxyl-functional, and is water dispersible when reacted with an amine.

U.S. Pat. No. 4,598,109 discloses a method of preparing a phosphated epoxy resin in the presence of enough water to hydrolyze at least about 50% of the oxirane functionality in the epoxy resin. The reaction is carried out in a water miscible organic solvent such as acetone, butanol, isproponal or 2-butoxy ethanol.

SUMMARY OF THE INVENTION

The present invention relates to a method of preparing a non-water dispersible, oxirane-defunctionalized, etherified, phosphoric acid ester of an epoxy resin comprising reacting (a) an epoxy resin having an epoxy equivalent weight of 170 to 3500;
(b) orthophosphoric acid in an amount of 0.2 to 0.45 equivalents per equivalent of epoxy resin;
(c) at least about 0.65 equivalents, per equivalent of epoxy resin, of a reactive hydroxy-functional compound having at least one hydroxy group reactive with an oxirane group of said epoxy resin, said hydroxyl-functional compound being a solvent for said epoxy resin and for the non water-dispersible, defunctionalized, etherified, phosphoric acid epoxy resin ester reaction product; and
(d) water in an amount of 0–20% of the weight of the orthophosphoric acid at a temperature and for a time sufficient to substantially completely defunctionalize all of the oxirane functionality of the epoxy resin to produce a non water-dispersible oxirane-defunctionalized, etherified, phosphoric acid ester of an epoxy resin, having an acid number of not more than about 20.

The invention also relates to a non water-dispersible oxirane-defunctionalized, etherified phosphoric acid ester of an epoxy resin made by the foregoing process and to the utilization of the etherified phosphoric acid ester in aqueous thermosetting coating compositions.

DETAILED DESCRIPTION

The epoxy resin useful in the invention can be any of the known resinous polyepoxides, including those described in the patents mentioned above. The term "epoxy resin" is used in the sense that the term is used in several of the patents mentioned above to include such compounds as the reaction product of two moles of epichlorohydrin with one mole of a polyhydric phenol such as bisphenol A, and also includes higher condensation products derived therefrom. Suitable epoxy resins include aliphatic, cycloaliphatic and aromatic epoxy resins. The epoxy resins have an epoxide equivalent weight (weight per epoxy) of at least about 190, preferably about 190–1200, and a number average molecular weight of at least about 380, preferably about 380–2400. More preferably, the epoxy resins have an epoxide equivalent weight of about 190–600 and a number average molecular weight of about 380–1200. Preferred epoxy resins are epoxide-terminated, linear epoxy resins having a 1,2-epoxy equivalency not substantially in excess of 2, preferably about 1.5–2, more preferably nominally difunctional. Particularly preferred epoxy resins are diglycidyl ethers of bisphenols such as bisphenol A. Epoxy resins of this type are widely available under the trade designation "Epon", "Der" and "Araldites", such as "Epon 828", "Epon 1001", etc.

Orthophosphoric acid is conventionally supplied as an 85% solution which is widely commercially available. However, orthophosphoric acid may also be provided in other forms such as pyrophosphoric acid, metaphosphoric acid and superphosphoric acid. The acid is provided in an amount of about 0.2–0.45 equivalents of orthophosporic acid per equivalent of epoxy resin (i.e. 0.2–0.45 P-OH groups per oxirane), preferably about 0.25–0.40, and optimally about ⅓. The orthophosphoric acid functions both as a reactant with the epoxy resin and as a catalyst for the reaction between the hydroxyl-functional compound and the epoxy resin.

The amount of water present is preferably minimized to minimize the formation of an alpha glycol formed by reaction of water with a terminal expoxide group. Where the orthophosphoric acid is present in condensed form, more water can be tolerated since some of it will be used in hydrolyzing the condensed acid. In general, the amount of water will not exceed 20% by weight based on the weight of the acid (as $H_3PO_4$) and preferably is not in excess of about 15% thereof.

The reactive hydroxyl-functional compound can be any such compound sufficiently reactive with poxy groups of the epoxy resin to produce a product which is substantially completely oxirane-defunctionalized having at least one hydroxyl group reactive with the oxirane functionality of the epoxy resin, and which is a solvent for the epoxy resin, and for the non water-dispersible, defunctionalized, etherified, phosphoric acid epoxy resin ester reaction product. Preferred hydroxyl-functional compounds are monofunctional and have a boiling point of about 65°–250° C. more preferably about 110°–200° C. The reaction of the epoxy resin and phosphoric acid is generally conducted at elevated temperatures and it is for this reason that a minimum boiling point of about 65° C., or more preferably at least about 110° C. is preferred. Hydroxyl-functional compounds of lower boiling point can be used but may require the use of elevated pressure to avoid excessive solvent loss at reaction temperatures required for efficient operation.

A principal use of the composition is in aqueous thermosetting coating compositions. Accordingly, it is preferred that the boiling point of the hyroxyl-functional compound is substantially less than conventional bake temperatures for the coating composition to ensure removal of any excess hydroxyl-functional compound. Accordingly, a boiling point maximum of about 250° C. is preferred. Preferably, the reactive hydroxyl-functional compound is mono-hydroxyl-functional, preferably has a hydroxyl group attached to a primary carbon atom, and more preferably is mono-hydroxyl-functional and has its single hydroxyl group attached to a primary carbon atom. Preferred reactive hydroxyl-functional compounds include aliphatic alcohols, cycloaliphatic alcohols, aromatic alcohols and alkyl ether alcohols, preferably those which are mono-functional and/or which have a hydroxyl group attached to a primary carbon atom. Particularly preferred reactive hydroxyl-functional compounds include n-butanol and 2-butoxy ethanol.

As mentioned above, it is essential that the present reaction product is substantially completely oxirane-defunctionalized by reaction with the acid and the hydroxyl-functional compound and that it is substantially devoid of free acid. The amount of acid used is such that substantially all of it will react with the epoxy resin. The reactivity of the hydroxyl-functional compound with the epoxy resin is catalyzed by the acid but is less than that of the acid. The relatively lower reactivity enables the free acid content of the present to be substantially eliminated. Some hydroxyl-functional compounds are, of course, more reactive than others but reactivity can be increased if needed by increasing reaction temperature, by using more solvent, by selecting more reactive solvents, or by combinations or these techniques. Butanol, for example, is more reactive than 2-butoxy ethanol.

The reactive hydroxyl-functional compound is provided in an amount at least sufficient to defunctionalize all of the oxirane groups not defunctionalized by reaction with the phosphoric acid. In general, it is sufficient to provide the hydroxyl-functional compound in an amount of at least about 0.75 equivalents per equivalent of epoxy resin (i.e. at least about 0.75 -OH groups per oxirane), preferably at least about 0.75 up to about 3 equivalents per equivalent of epoxy resin, and more preferably at least about 1 up to about 2 equivalents per equivalent of epoxy resin.

Reactions involved in the present invention will be more readily understood with reference to the following simplified illustrations:

(a) Epoxy resin+acid+alcohol→etherified triester

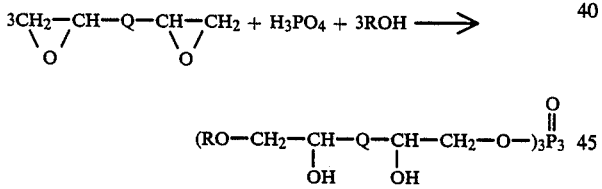

(b) Epoxy resin+acid+water→alpha glycol mono-ester

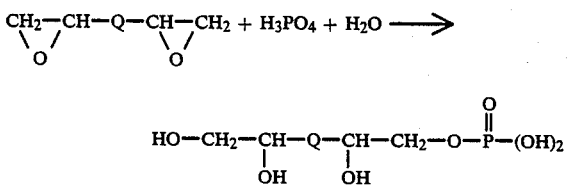

In the foregoing reactions, Q represents a divalent organic residue of an epoxy resin.

Reaction (a) illustrates the formation of a triester of the epoxy resin with orthophosphoric acid and etherification of the epoxy by reaction with alcohol, the latter reaction being catalyzed by the phosphoric acid. While it is quite feasible and often preferred to effect the reaction such that substantially all of the phosphoric acid reaction product is in the form of a triester, it is not necessary to do so in which case di-ester and mono-ester will be formed. Reaction (b) illustrates formation of a mono-ester by reaction of the epoxy resin with phosphoric acid and water, in which case on alpha glycol is formed.

It is an important feature of the invention to be able to provide a product which contains no free phosphoric acid, as free acid will deleteriously affect its use in the white coatings and varnishes mentioned above. Where the reaction product contains mono-ester or di-ester, the product will have an acid number resulting from the presence of un-esterified P—OH groups. Since acid number will also result from free acid, and since it is preferred to have no free acid, it is therefore preferred to produce a reaction product with low acid number, since the lower the acid number, the less likely it is that the product contains any free phosphoric acid. In general, the acid number of the reaction product is less than about 20, preferably less than about 10, more preferably less than about 5, and may be substantially 0. While free acid is not desirable, the presence of di-ester and mono-ester is permissible and may be preferred since these esters may be more compatible with other components of the white coatings and varnishes. In that event, it is preferred to first form essentially all triester and to obtain the lower esters by hydrolysis. This is readily achieved by reacting the reaction product with water. In addition to forming di-ester and mono-ester, hydrolysis will also result in forming alpha glycol from the cleaved-off epoxy resin groups. The presence of a substantial amount of alpha glycol in the present reaction product is undesirable because white coatings and varnishes incorporating products having a high alpha glycol content are subject to post-curing embrittlement. Accordingly, it is preferred to effect hydrolysis only to the extent of increasing the acid number of the product to a value not in excess of 75, preferably to a value in excess of 10 but not in excess of 60, and more preferably not in excess of 50. Similarly, it is preferred that the alpha glycol content of the reaction product be no more than 15% alpha glycol groups based on the total number of oxirane groups in the epoxy resin, preferably not more than 10% and still more preferably not more than 5%. It will be apparent from reaction (b) above that alpha glycol may also be formed by reaction between epoxy resin and water present in the reaction. Since the presence of a substantial amount of alpha glycol product is undesirable, the amount of water present in the reaction is generally not more than 20% by weight based on the weight of orthophosphoric acid (as 100% $H_3PO_4$) present. Accordingly, if the acid is added incrementally to the reaction mixture, it is preferred also to add the water incrementally.

A second important feature of the invention is to substantially completely defunctionalize the oxirane functionality of the epoxy resin. This is achieved by effecting reaction between the epoxy resin and both the orthophosphoric acid and the hydroxyl-functional compound as shown in reaction (a) above. As mentioned above, the latter reaction is catalyzed by the phophoric acid. To achieve substantially complete absence of oxirane functionality, the reactants are reacted in the ratios mentioned above. The etherified phosphoric acid ester reaction product of the present invention is considered to be substantially fully difunctionalized when the weight per epoxy is determined to be at least 50,000.

The oxirane-defunctionalized, etherified, phosphoric acid epoxy resin ester of the present invention is not dispersible or thinnable in water.

As mentioned above, the product has particular utility in aqueous thermosetting coating compositions, particularly white coatings and varnishes used in coating the exterior of drawn and ironed aluminum containers. Such containers, for example those used for beer and ale, are routinely pasteurized after being filled. When pasteurization is carried out under more severe conditions conventional white coatings and varnishes fail. Adhesion of the coatings under these conditions is substantially increased by incorporating therein the reaction product of the present invention. The amount of epoxy resin ester which should be added to substantially increase adhesion will generally be 5 to 20% by weight based on the weight of the aqueous thermosetting coating composition to which the present epoxy resin ester is added.

It is preferred that the reactive hydroxyl-functional compound employed in the present reaction is compatible with the aqueous thermosetting coating composition to enable the present epoxy resin ester to be incorporated therein directly. Where the present product can be incorporated directly into the coating composition, it is preferred that residual hydroxyl-functional compound has a boiling point such that it is removed during baking the coating at a conventional baking temperature for that coating composition. However, compatibility is not necessary as any residual hydroxy-functional compound can be removed from the present reaction product (and replaced with a compatible solvent as appropriate) before incorporating the epoxy resin ester in the coating compostion. It is also possible to simply add a co-solvent, or to rely on one or more co-solvents in the aqueous thermosetting coating compositions, to facilitate incorporation of the present non water-dispersible reaction product into a conventional aqueous thermosetting coating composition such as a white coating or varnish mentioned above.

In preparing the resin ester, the reaction mixture may be provided by first forming a solution of the epoxy resin in a portion of the hydroxyl-functional compound and then adding the organic acid thereto. The acid may be added to the solution at substantially the same time as the epoxy resin and the hydroxyl-functional compound. In any event, it is preferred that the acid reactant be added all at once or before the hydroxyl-functional compound because the acid catalyzes the reaction between the epoxy resin and the hydroxyl-functional compound and because it is essential that all of the acid react with the epoxy groups to ensure the absence of free acid in the reaction product.

The resin, the hydroxyl-functional compound and the organic acid are typically mixed at a temperature of about to 50° C. to 95° C., preferably about 55° C. to 90° C. Once the reactants are contacted, the reaction mixture is maintained at a temperature preferably about 90° C. to 200° C., and more preferably about 100° C. to 140° C. The reaction is allowed to proceed for a period of about 45 minutes to 6 hours, and more preferably for a period of about 45 minutes to 2 hours. The thus prepared resin ester will typically have no free acid, an acid number of less than about 20, and will be substantially oxirane-defunctionalized.

The resin ester product obtained as indicated above may be further reacted with an amount of water effective to hydrolyze any resin tri-ester to the corresponding di-ester product and any resin di-ester to the corresponding mono-ester product. Generally, the acid number of this hydrolyzed resin ester product will not be in excess of about 75, and preferably not in excess of about 60. It is important to note that essentially all of the acid contributing to this acid number value stems from the release of acid hydrogen ions from the monoester and diester products.

As mentioned above, the aqueous coating compositions in which the present epoxy resin ester are useful include a base resin, a cross-linking resin, which together make upon the film-forming portion of the composition, an aqueous carrier, often a relatively small amount of organic solvent, catalyst, and other conventional addenda such as a lubricant, a pigment, and the like. The total non-volatile content of such compositions is generally about 25 to 70 wt %. To these aqueous coating compositions is added an amount sufficient to enhance adhesion, generally about 5 to 25% by weight, based on the weight of the solids coating components, of the epoxy resin ester of the present invention. Suitable compositions include base resins which contain carboxyl or hydroxyl groups which are cross linkable by amino-formaldehyde based cross linking resin. In the white coatings and varnishes mentioned above, acrylic, polyester, and alkyd resins are widely used base resins and melamine-formaldehyde resins are widely used as cross linking agents.

EXAMPLE 1

38.7 g of 85 wt. % orthophosphoric acid are added all at once to a solution of 593.1 g of a bisphenol A-type epoxy resin having a molecular weight of about 400 and an epoxide equivalent weight (EEW) of about 200 in 284.1 g of butanol and 84.1 g of butyl cellosolve at a temperature of 90° C. Immediately thereafter, an exothermic reaction develops which results in an increase of the reaction temperature to 140° C. The reaction mixture is held at about 140° C. for about 2 hours until a weight per epoxy of infinity is reached. The acid number is less than 6. Even though this reaction contains a theoretical starting amount of solids of 60.80% wt.% based on epoxy and acid at the end of the reaction the amount of solids (high bake solids—10 minutes at 375° F.) is about 75%. This increase of solids is a consequence of the reaction of solvents with oxirane groups of the resin resulting in the etherified resin. The product is not waterdispersible.

COMPARISON EXAMPLE A

Example 1 is conducted in a manner similar to Example 1 but much less solvent is used-149 g of butyl cellosolve. The acid number is less than 1 and the weight per epoxy is about 1200. This is an unacceptably low oxirane weight per epoxy which results from a limited amount of solvent being present in the mixture. The etherification (capping) of the oxirane group of the resin with solvent molecules is thus incompelte due to insufficient solvent molecules in the medium. Therefore a large number of oxirane groups remain unreacted in the resin ester and the product and process of this comparison example are outside the present invention. This comparative example shows the important role of the solvent (i.e. the hydroxyl-function compound) in defunctionalizing the epoxy resin.

COMPARISON EXAMPLE B 38 g of 85% wt. % ortho phosphoric acid are added all at once to a solution of 588 g of bisphenol A type epoxy resin having a molecular weight of about 400 (EEW of about 200) in 141 g of butanol and 227 g of butyl cellosolve at a temperature of 90° C. Immediately thereafter an exothermic reaction develops which results in an increase of the reaction temperature to 130 °C. which is held for 120 minutes. A weight per epoxide of 2400 is obtained and the acid number is 0. The hydroxyl-functional compounds are the same as those in Example 1 but there is less of the relatively more reactive butanol and more of the relatively less reactive n-butoxy ethanol. The reactivity and amount of the hydroxyl-functional compound in this example is not sufficient to substantially defunctionalize the epoxy resin. Accordingly, the example is outside the scope of the present invention.

EXAMPLE 2

38 g of 85 wt. % of orthophosphoric acid are added to 588 grams of a bisphenol A type of epoxy having a molecular weight of about 400 in 265 g of butanol and reacted together in the same procedure as Example 2. The resin ester obtained has an infinite weight per epoxy and a final acid number of about 10–15. This increase in acid and number represents the presence of acidic OH groups in the mono and di esters of phosphoric acid and not free acid species. Butanol is more reactive with the epoxy than is butyl cellosolve and this explains the relatively higher acid number and the larger amount of mono and di esters which result from the use of the more reactive solvent.

EXAMPLE 3

38 gm of 85% phosphoric acid are added dropwise to a solution of 588 gm of bisphenol A type epoxy resin having molecular wt. of about 400 (EEW of about 200) in 126 gm of butanol and 154 gm of butyl cellosolve at a temperature of 120°–150° C. The progress of the reaction during the phosphoric acid addition is monitored by acid number and weight per epoxy. After ¾ of the phosphoric was added, the weight per epoxy was approaching infinity and acid number was less than 2. This example shows the role of the phosphoric acid as a catalyst in the oxirane-hydroxyl reaction. By adding the acid dropwise, reaction with the hydroxyl-functional compound is favored in comparison with a procedure in which the acid is added all at once.

EXAMPLE 4

28 grams of water are added to 1000 grams of the resin ester produced in Example 1 to hydrolyze the tri- and di-esters to mono-esters. The reaction is maintained at 125° C. for 120 minutes. At the end of the hydrolysis, the acid number is determined to be about 30. This acid number reflects a higher content of mono- and di-esters rather than free phosphoric acid. The product is not water-dispersible.

The following examples illustrate the improved adhesion obtained by adding an epoxy resin ester in accordance with the present invention to conventional aqueous thermosetting coating compositions such as varnishes useful in coating drawn and ironed aluminum beverage containers. Conventional varnish (i.e. clear coating) formulations are used in the examples. The additive employed is the reaction product of Example 1, having a total non-volated (TNV) content of about 75% by weight.

Formulations A through F described in Examples 5–7 below are applied to drawn and ironed aluminum beer can stock. Formulations A, C and E are typical commercial varnish formulation for drawn and ironed aluminum beer cans. Film weights are applied are in the range of 2–3 mg/in$^2$. The panels are then cured in a gas-fired oven for 7 minutes at 400° F. They are then placed in a pasteurization solution containing 3.8 grams of sodium tetraborate/liter water. Under normal conditions the panels are subjected to the sodium tetraborate solution at 160° F. for 30 minutes. For more severe conditions, a pasteurization bath containing the tetraborate solution is heated to 190° F. for various periods of time. After pasteurization, the coating is cross-hatched with a knife and then Scotch taped-tested (ASTM D3359) to determine the extent of coating loss.

| Ingredient | Formulation A (No Additive) (Parts by Weight) | Formulation B (With Epoxy Resin Ester of Example 1) (Parts by Weight) |
|---|---|---|
| Acrylic resin | 26.7 | 31.2 |
| Alkyd resin | 15.5 | 11.8 |
| Melamine/Formaldehyde Cross Linker Resin | 13.1 | 11.3 |
| Dimethylaminoethanol | 1.8 | 1.1 |
| Lubricant | 0.6 | 1.1 |
| Catalyst | 0.2 | 0.2 |
| Water | 42.1 | 39.7 |
| Additive of Example 1 | — | 3.6 |
| Viscosity (Ford 4 Cup. 77° F.) | 85 seconds | 85 seconds |
| TNV | 37 wt. % | 37 wt. % |

After baking, the coated stock is subjected to pasteurization. Under the normal pasteurization conditions described above, both formulations A and B suffer no loss of adhesion. However, when the pasteurization temperature is raised to 190° F., the film of formulation A is totally removed before Scotch tape testing. After two hours at 190° F. in the same tetraborate solution, the film of formulation B is intact and shows no loss after Scotch tape testing.

| Ingredient | Formulation C (No Additive) (Parts by Weight) | Formulation D (With Epoxy Resin Ester of Example 1) (Parts by Weight) |
|---|---|---|
| Acrylic resins | 44.6 | 40.7 |
| Alkyd resin | 2.6 | |
| Melamine/formaldehyde cross linker resin | 11.0 | 11.0 |
| Lubricant | 2.3 | 2.5 |
| Catalyst | 0.2 | 0.2 |
| Dimethylaminomethanol | 0.8 | 0.7 |
| Butanol | 2.0 | 1.0 |
| Water | 36.5 | 38.7 |
| Epoxy Resin Ester of Example 1 | — | 5.2 |
| Viscosity (Ford 4 Cup at 77° F.) | 85 seconds | 75 seconds |
| TNV | 35 wt. % | 35 wt. % |

After baking, the coated stock is subjected to pasteurization in the same manner as panels coated with formulations A and B described above. Under the normal test conditions, both formulations prove adequate. However, formulation C fails under the more severe pasteurization conditions, whereas formulation D does not.

| Ingredient | Formulation E (No Additive) (Parts by Weight) | Formulation F (With Epoxy Resin Ester of Example 1) (Parts by Weight) |
|---|---|---|
| Acrylic resin | 69.14 | 61.64 |
| Melamine/formaldehyde cross linker resin | 7.6 | 9.41 |
| Lubricant | 0.8 | 0.8 |
| Catalyst | 0.33 | 0.34 |
| Water | 22.1 | 22.46 |
| Epoxy Resin Ester of Example 1 | — | 5.35 |
| Viscosity (Ford 4 Cup, 77° F.) | 65 seconds | 65 seconds |
| TNV | 30.4 wt. % | 30.4 wt. % |

After baking, the coated stock is subjected to pasteurization in a boiling solution of 3.8 grams of tetraborate per liter of water also containing 1% of "Joy" detergent. After thirty minutes, formulation E shows 95% coating failure in the Scotch tape test, whereas formulation F shows less than 2% failure.

What is claimed is:

1. A method of preparing a non-water dispersable, oxirane-defunctionalized, etherified, phosphoric acid ester of an epoxy resin comprising reacting
   (a) an epoxy resin having an epoxy equivalent weight of at least about 190;
   (b) orthophosphoric acid in an amount of 0.2 to 0.45 equivalents per equivalent of epoxy resin;
   (c) at least about 0.65 equivalents, per equivalent of epoxy resin, of a reactive hydroxyl-functional compound having at least one hydroxy group reactive with an oxirane group of said epoxy resin, said hydroxyl-functional compound being a solvent for said epoxy resin and for the non water-dispersible, defunctionalized, etherified, phosphoric acid epoxy resin ester reaction product; and
   (d) water in an amount of 0–20% of the weight of the orthophosphoric acid
at a temperature and for a time sufficient to substantially completely defunctionalize all of the oxirane functionality of the epoxy resin to produce a non water-disperable oxirane-defunctionalized, etherified, phosphoric acid ester of an epoxy resin, having an acid number of less than about 20.

2. A method according to claim 1 wherein said oxirane-defunctionalized, etherified, epoxy resin ester has an acid number of less than about 10.

3. A method according to claim 1 wherein said oxirane-defunctionalized, etherified, epoxy resin ester has an acid number of less than about 5.

4. A method according to claim 1 wherein said oxirane-defunctionalized, etherified, epoxy resin ester has an acid number of substantially 0.

5. A method according to claim 1 comprising the further step of hydrolyzing said oxirane-defunctionalized, etherified, epoxy resin ester to convert tri-ester to di-ester and to convert di-ester to mono-ester, said hydrolysis being effected sufficiently to raise the acid number of said epoxy resin ester to a value not in excess of about 75.

6. A method according to claim 4 wherein hydrolysis is effected sufficiently to increase the acid number of the epoxy resin ester to a value above 10 and not more than 60.

7. A method according to claim 1 wherein said orthophosphoric acid is present in an amount of 0.25 to 0.40 equivalents per equivalent of epoxy resin and wherein said reactive hydroxyl-functional compound is present in an amount of 0.75 to 2.0 equivalents per equivalent of epoxy resin.

8. A method according to claim 1 wherein said reactive hydroxyl-functional compound is mono-functional and has a boiling point of at least 110° C.

9. A method according to claim 8 wherein said reactive mono-functional hydroxyl compound has a hydroxyl group which is attached to a primary carbon atom.

10. A method according to claim 9 wherein said reactive hyroxyl-functional compound is selected from the group consisting of aliphatic alcohols, cycloaliphatic alcohols, aromatic alcohols, and alkyl ether alcohols.

11. A method according to claim 1 wherein said epoxy resin is selected from the group consisting of polyglycidyl ethers of polyhydric phenols and polyglycidyl ethers of polyhydric alcohols.

12. A method according to claim 10 wherein said epoxy resin has an epoxy equivalent weight of about 190 to 1200.

13. A product produced by the process of claim 1.

14. A product produced by the process of claim 2.

15. A product produced by the process of claim 3.

16. A product produced by the process of claim 6.

17. A product produced by the process of cliam 9.

18. A product produced by the process of claim 10.

19. In an aqueous, thermosetting coating composition containing at least one film-forming base resin, and at least one cross-linking agent, the improvement wherein said composition further includes a non water-disperisble oxirane-defunctionalized, etherified, phosphoric acid ester of an epoxy resin produced by the process of claim 1 in an amount sufficient to enhance the adhesion of said aqueous coating composition to a substrate.

20. An aqueous, thermosetting coating composition according to claim 19 wherein said base resin is selected from the group consisting of acrylic resins and alky resins, and wherein said cross-linking agent comprises a melamine-formaldehyde cross-linking resin, said coating composition being useful as a varnish or white coating for a drawn and ironed aluminum container.

21. An aqueous, thermosetting coating composition according to claim 19 wherein said epoxy resin ester is present in an amount of from 5 to 25% by weight based on the weight of the composition.

* * * * *